June 20, 1972  D. J. ALBERT  3,671,121
EXPOSURE DEVICE FOR CONTROLLING CHARGE ON A PORTION OF
A CHARGED SURFACE BORDERING AN IMAGE FRAME
PROJECTED ON THE CHARGED SURFACE
Filed Aug. 5, 1970
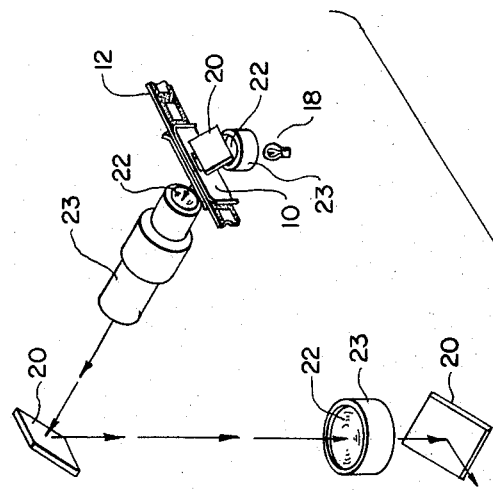
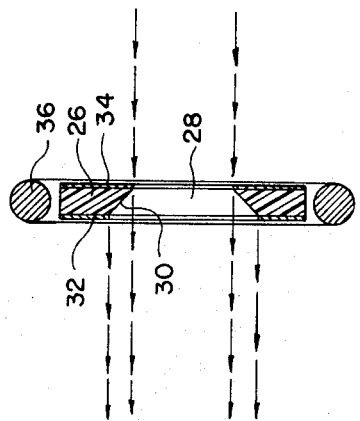
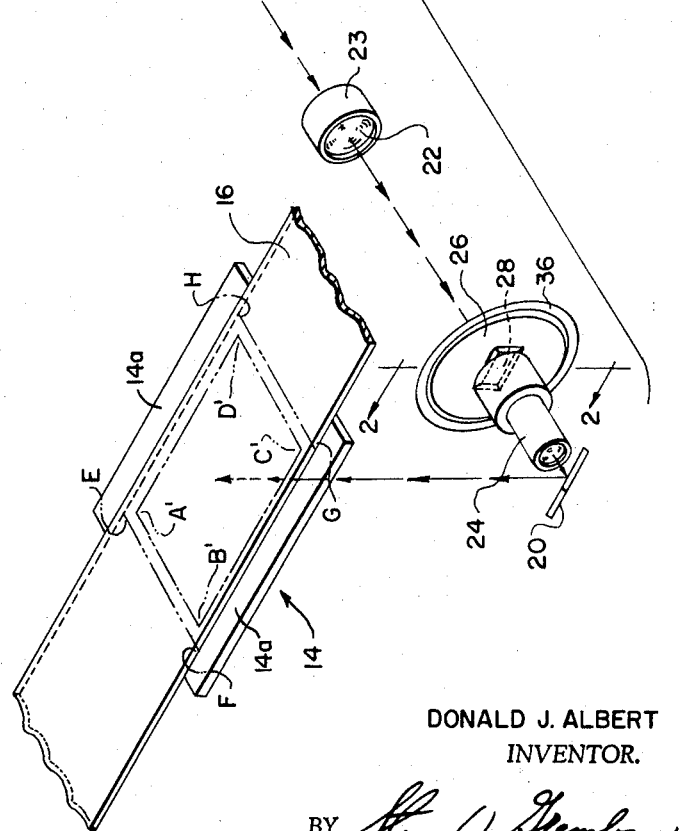
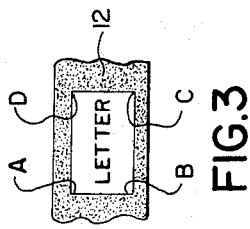
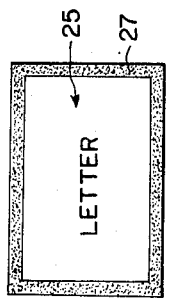
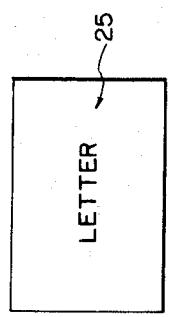
DONALD J. ALBERT
INVENTOR.
BY
ATTORNEYS

United States Patent Office 3,671,121
Patented June 20, 1972

3,671,121
EXPOSURE DEVICE FOR CONTROLLING CHARGE ON A PORTION OF A CHARGED SURFACE BORDERING AN IMAGE FRAME PROJECTED ON THE CHARGED SURFACE
Donald J. Albert, Rochester, N.Y., assignor to Eastman Kodak Company, Rochester, N.Y.
Filed Aug. 5, 1970, Ser. No. 61,119
Int. Cl. G03g 15/00
U.S. Cl. 355—7
25 Claims

ABSTRACT OF THE DISCLOSURE

A mechanism and method is disclosed for controlling charge on a portion of the surface of a photoconductive member bordering an image frame, containing an image and a background portion projected onto the photoconductive surface from an original such as microfilm, wherein positive microfilm is dark or opaque between and around adjacent image frames and negative microfilm is transparent or light transmitting between and around adjacent image frames. The mechanism has an aperture through which the image frame is projected, surrounded by an opaque mask portion for preventing illumination of the border area on a charged photoconductive surface surrounding the image frame projected onto the photoconductive surface for those situations in which positive prints are made from negative microfilm. The mechanism further includes a light directing mask portion surrounding the aperture which, when activated, directs illumination onto a portion of the charged surface of the photoconductive surface bordering the image frame projected thereon for discharging the border portion for those situations in which positive prints are made from positive microfilm. Thus, in all situations the charge on the border portion of a photoconductive surface adjacent the image frame is maintained at substantially the same potential as background portions within the image frame.

BACKGROUND OF THE INVENTION

Field of the invention

This invention relates generally to an exposure device and method, and more specifically to an exposure device and method for controlling charge on the portion of the surface of a charged photoconductive member bordering an image frame projected onto the photoconductive surface from film or the like.

Description of the prior art

In the electrophotographic copying process, it is known to project the image of a document having a white or light reflecting background, i.e., a positive original onto the charged surface of a photoconductive member. Normally, the projection optics of the document illuminating mechanism illuminates and exposes an area of the charged surface of the photoconductive member that is larger than the projected image area of the document. The projected illumination surrounding the opaque portions of the projected image area discharges the corresponding illuminated portion of the photoconductive surface leaving a positive electrostatic latent image. If this image is developed by a toner having a polarity opposite that of the latent electrostatic image, a positive copy of the document will subsequently be formed with a white background. If a negative original having a dark background is projected onto a charged photoconductive member, reverse development of the resulting electrostatic image is necessary to produce a positive copy, i.e., the discharged areas are developed by using a developer or toner having a charge of the same polarity as the charge on the photoconductive member in conjunction with a development electrode of opposite polarity so that the toner particles are repelled by the charged areas and attracted to the exposed or discharged areas. Once again, a positive copy of the document is formed having a white background.

A problem arises in two copying situations involving microfilm. Since negative microfilm normally has transparent borders around and between adjacent image frames, the area of the photoconductive surface extending beyond or surrounding the microfilm image frame will be discharged due to exposure to light and will attract toner during reverse development resulting in the subsequent formation of a positive copy having an undesirable black border. During direct development, the charged portions attract toner resulting in the subsequent formation of a negative copy having a white border. Also, in making positive copies from positive microfilm, which normally has dark borders around and between adjacent image frames, by direct development, the border area of the photoconductive member will not be exposed, and will retain its charge and hence be developed and subsequently form a positive copy having an undesirable black border. When making negative copies from the positive microfilm by reverse development, the charged portions repel toner and when developed subsequently forms a negative copy having a white border. The copies having the white border are normally not objectionable, but those with the black border are objectionable from the appearance standpoint. In addition, such copying is wasteful of toner, and requires the toner on the photoconductive member surrounding the document image area to be cleaned off after each exposure thus adding to the burden to the cleaning station.

SUMMARY OF THE INVENTION

This invention includes within its scope an exposure system for maintaining the portion of a charged photoconductive surface surrounding or bordering an image area or frame projected onto the photoconductive surface at substantially the same potential as the background portion within the image frame. Each image area or frame comprises an image surrounded by a background portion. The exposure system comprises means defining an aperture through which the image area of an original is projected onto a light sensitive surface, such as the surface of a charged photoconductive member. The exposure system further comprises an opaque mask portion surrounded by an opaque border and a positive copy is made by direct development. In a preferred embodiment of the invention, the mask of the border illuminating means is formed of a light-transmitting material having an aperture and an opaque side surrounding a projected image frame. The exposure system also comprises a light directing means surrounding the aperture for directing, when activated, illumination on the border area of the photoconductive surface bordering the image frame projected onto the photoconductive surface when the image frame is projected from a positive original (dark image and light transmitting background) surrounded by an opaque border and a positive copy is made by direct development. In a preferred embodiment of the invention, the mask of the border illuminating means is formed of a light-transmitting material having an aperture and an opaque side surrounding the aperture and facing the original to block illumination directed through a light transmitting or from a light reflecting border surrounding a negative original. Accordingly, the border area around the image frame on the photoconductive surface will not be discharged but will remain at substantially the same potential as the dark or opaque portions of the background areas within the image frame. The opposite side of the mask facing the photoconductive surface is light transmitting to direct illumination from an annular light source associated with the mask into a border area on the photoconductive surface bordering a positive image frame projected onto the photoconductive surface from a positive original surrounded by a dark or opaque border. Conveniently, the mask may have a beveled edge for refracting or deflecting light from the annular light source onto the photoconductive surface with the annular light source extending around the mask. Thus, the border will be discharged along with the background on the photoconductive surface so that upon using direct development methods only the positive image is developed. Of course, it will be understood that the annular light source will be turned off during exposure of the photoconductive surface to a negative original as discussed above.

One object of the present invention is to provide an exposure device for maintaining the charge on a photoconductive member corresponding to the projected background portions of an image frame and the border adjacent the image frame at substantially the same potential.

Another object of the invention is to provide means for illuminating and discharging the non-illumiated area of a photoconductive member surrounding or bordering an image area or frame of a positive original projected into the photoconductive member when direct development techniques are used to make a positive copy.

Another object of the invention is to provide a border illuminating mechanism for illuminating and discharging the charged area of a photocoductive member surrounding or bordering an image area projected onto the photoconductive member so that this area will not attract pigment.

Another object of the invention is to provide an opaque mask for preventing illuminating and discharging of the area of a photoconductive member surrounding or bordering an image area of a negative original projected onto the photoconductive member when reverse development techniques are used to make a positive copy.

Another object of the invention is to provide a mechanism for illuminating or blocking illumination of the charged area of a photoconductive member surrounding or bordering an image area projected thereon, which is of simple design and construction, thoroughly reliable and efficient in operation, and economical to manufacture.

The invention and its objects and advantages will become more apparent from the detailed description of the preferred embodiment presented below.

BRIEF DESCRIPTION OF THE DRAWINGS

In the detailed description of the preferred embodiment of the invention presented below, reference is made to the accompanying drawing, in which:

FIG. 1 is a perspective view of a light projection system for a copying device in which a preferred embodiment of the illuminating mechanism of this invention is incorporated;

FIG. 2 is a section view taken along line 2—2 of FIG. 1 showing further details of the illuminating mechanism of FIG. 1;

FIG. 3 is a segmental top plane view of a film having an image area of a letter to be copied;

FIG. 4 is a segmental top plan view of a copy made of the image area of FIG. 3 at twice the magnification without border illumination; and FIG. 5 is a view similar to FIG. 4 showing the copy made of the image area of FIG. 3 with border illumination.

DESCRIPTION OF THE PREFERRED EMBODIMENT

Because copying devices such as electrophotographic copiers are well known, the present description will be directed in particular to elements forming part of, or cooperating more directly with, the present invention, copying device elements not specifically shown or described herein being understood to be selectable from those known in the art.

With reference to the drawing, this invention is shown embodied in a projection system for an electrophotographic copier or the like, not shown, of the type having a film gate 10 for supporting a material 12 such as a film or document to be copied, an exposing station 14 at which a light sensitive electrophotoconductive member 16 capable of being electrically charged is fixedly supported by support means 14a, and a light projecting means for projecting an illuminated image of the material 12 onto the charged photoconductive member 16. In copying devices where the film gate 10 and the exposing station 14 are located some distance apart, the light projecting means may comprise a light source or lamp 18 for illuminating the material, and optical elements such as mirrors 20, lenses 22 mounted in suitable mounts 23, and a final projection lens unit 24, for projecting an image area on film 12 onto the charged photoconductive member 16. The final projection lens unit 24 may be selected to project the image area of the film 12 to be copied at its original size or preferably at some suitable magnification, particularly where the material to be projected is in miniature form such as a microfilm of a normal sized document, and a normal sized copy of the document is desired.

Let us assume that the material to be copied is in the form of a strip of conventional positive microfilm 12 as seen in FIG. 3 in which the film carrier strip is dark or opaque and contains light transmitting image areas designated ABCD of any suitable subject such as a letter having the normal opaque alphabetical charcters, not shown. The microfilm 12 is illuminated and the letter image area projected onto the charged photoconductive member 16. As seen in FIG. 1, the projected image area on the surface of the photoconductive member 16, designated A'B'C'D', is normally not as wide as the charged area of the photoconductive member to ensure complete image coverage. The illumination passing through the clear or light-transmitting portion of the letter image area ABCD of the microfilm will strike the charged surface of the photoconductive member 16 and discharge it. The dark or opaque characters of the letter and opaque carrier film block the illumination, and hence the parts of the charged photoconductive member corresponding thereto will not be exposed to the light and will remain charged. Subsequently, in the process of making a positive copy by direct development, a toner carrying an opposite charge is brought into contact with the photoconductive member 16, and adheres to the charged areas of the photoconductive member resulting in a direct latent image of the letter and a border surrounding the letter. When a copy paper which is normally slightly larger than the projected image area A'B'C'D' to ensure complete coverage is placed on the photoconductive member 16 and subjected to an electrical charge of the same polarity as that of the photoconductive member, the pigmented image and border leave the photoconductive member and adhere to the copy paper to form a positive copy of the original letter. If the transferred image on the copy paper is made permanent by heat or the like, the resulting copy will be a positive copy of the original letter surrounded by a black border as seen in FIG. 4. This would normally be objectionable and wasteful of toner.

To eliminate this objectionable feature, the light projection means of the copier is provided with a border illumination mechanism in the form of a mask 26 of any suitable shape such as circular, as best seen in FIGS. 1 and 2 having an aperture 28 through which the illuminated image area of the film is projected. The shape of the aperture 28 normally conforms to the shape of the image area to be copied. The mask 26 is formed of any suitable light-transmitting material, such as an acrylic material, having a preferably frosted beveled surface 30 immediately surrounding the aperture and opaque surfaces 32, 34 on opposite sides of the mask, although surface 32 need not be opaque. Any suitable light source such as a lamp 36 is mounted encircling mask 26, and the periphery of the mask is light transmitting so that light from lamp 36, when activated or enabled, is guided or piped between the opaque surfaces 32, 34 and illuminates the beveled frosted area 30 and is deflected thereby toward the exposing station 14. Accordingly, when the light transmitting image areas of a conventional positive microfilm such as shown in FIG. 3 are to be copied, the microfilm illuminating lamp 18 and the border illuminating lamp 36 are operated simultaneously for projecting onto the photoconductor the image area A'B'C'D' and an illuminated border area between designated areas A'B'C'D' and EFGH as seen in FIG. 1. The illuminated border area is at least as wide as the charged area of photoconductor 16 and discharges the border area of the photoconductor so that it is at substantially the same potential as the image area background portions, preventing the attraction of pigment to such area and the formation of an objectional black border on any copy (see FIG. 5) produced from the photoconductor.

The opaque surface 34 of mask 26 facing the illumination eminating from the light source 18 prevents illumination of the border surrounding the projected image area A'B'C'D' on the photoconductor. This is desirable in making a positive copy of a conventional negative microfilm in a copying device in which reverse development techniques are used in which the charged portions of the photoconductive member 16 repel toner. The toner is attracted instead to the discharged areas by use of a development electrode as discussed above. Since each image frame of a negative microfilm has an opaque image area background and a clear or light transmitting image area, and the image frames are surrounded by clear or light transmitting area, the opaque surface 34 of mask 26 prevents illumination and discharging of the portion of the photoconductive member surrounding the image area A'B'C'D' projected thereon from a negative microfilm. In making a positive copy of image area A'B'C'D' by reverse development, the charged portion of the photoconductive member surrounding image area A'B'C'D' repels toner which instead is attracted to the uncharged areas by a development electrodes, resulting in a copy that is free of an undesirable black border. During such projection of a negative microfilm onto a photoconductive member 16, the border illuminating mechanism 26 is inactive.

The invention has been described in detail with particular reference to a preferred embodiment thereof, but it will be understood that variations and modifications can be effected within the spirit and scope of the invention as described hereinabove.

I claim:

1. An exposure device for controlling charge on a border surrounding an image area on a charged photoconductive surface, said image area being projected from an original having a border with light transmitting or light blocking characteristics which are opposite to the light transmitting or light blocking characteristics of the background portion of said original image area, to form a tonable electrostatic latent image on said photoconductive surface, said device comprising:

means defining an aperture through which the image area of said original is projected onto said charged photoconductive surface;

means for supporting said charged photoconductive surface in a fixed position in alignment with said aperture during projection of the image area; and means associated with said aperture defining means for causing the charge on said border surrounding said image area on said charged photoconductive surface while said photoconductive surface remains at said fixed position to be substantially the same as the charge in the background portions of the image area on said photoconductive surface so that subsequent toning of said electrostatic latent image will not result in a toned border around a toned image.

2. The invention according to claim 1 wherein said aperture defining means comprises a light transmitting mask, and said means associated with said aperture defining means comprises a lamp for illuminating said mask.

3. The invention according to claim 1 wherein said aperture defining means comprises a light transmitting mask having a beveled surface on one side surrounding and contiguous to said aperture, and means associated with said aperture defining means comprises a lamp which encircles said mask.

4. The invention according to claim 1 wherein said aperture defining means comprises a light transmitting mask having a beveled surface on one side surrounding and contiguous to said aperture, said mask further having an opaque surface on its opposite side surrounding and contiguous to said aperture.

5. In an exposing device for controlling electrical charge on a border area surrounding an image area projected by illumination onto an electrically charged surface, the combination comprising:

illumination blocking means for blocking image illumination of a border area on a charged surface surrounding said projected image area;

means for supporting said charged surface in a fixed position in alignment with said blocking means during projection of the image area; and illumination directing means adapted when enabled to defeat said illumination blocking means by illuminating said border area while said charged surface remains at said fixed position.

6. The invention according to claim 5 wherein said illumination blocking means comprises an element having an opaque surface.

7. The invention according to claim 5 wherein said illumination blocking means comprises an element having an opaque surface, and said illumination directing means comprises a lamp.

8. The invention according to claim 5 wherein said illumination blocking means comprises an element having an aperture through which said image area is projected onto said charged surface, and an opaque surface on said element surrounding and contiguous to said aperture, and said illumination directing means comprises a lamp encircling said element.

9. The invention according to claim 5 wherein said illumination blocking means comprises an element having an aperture through which said image area is projected onto said charged surface, and an opaque surface on said element surrounding and contiguous to said aperture, and said illumination directing means comprises an illumination transmitting portion of said element encircling said aperture, and a lamp encircling said illumination transmitting portion.

10. The invention according to claim 9 wherein said illumination transmitting portion is formed of an allumination transmitting material and has a beveled surface adjacent said aperture for deflecting illumination toward said border area.

11. The invention according to claim 5 wherein said illumination blocking means and said illumination directing means comprises a unitary mask having an aperture through which said image area is projected onto said charged surface.

12. The invention according to claim 11 wherein said illumination blocking means comprises an opaque surface on said mask surrounding and contiguous to said aperture, and said illumination directing means comprises an illumination transmitting portion of said mask surrounding and contiguous to said aperture.

13. The invention according to claim 12 wherein said illumination transmitting portion has a beveled surface adjacent and contiguous to said aperture for deflecting illumination toward said border area.

14. The invention according to claim 13 wherein said illumination directing means comprises a lamp encircling said illumination transmitting portion.

15. The invention according to claim 5 wherein said illumination blocking means and said illumination directing means comprises a unitary mask having an aperture through which said image area is projected onto said charged surface, said illumination blocking means comprises a first opaque surface on one side of said mask surrounding and contiguous to said aperture, said illumination directing means comprises an illumination transmitting portion of said mask having a beveled surface surrounding and contiguous to said aperture for deflecting illumination toward said border area, said illumination transmitting portion having a second opaque surface on the opposite side of said mask surrounding and contiguous to said beveled surface, said illumination directing means comprises a lamp encircling said illumination transmitting portion, and said first and second opaque surfaces cooperate to define an illumination guide for guiding illumination from said lamp to said beveled surface.

16. In a mechanism for illuminating a border area on an electrophotosensitive surface surrounding an image area projected thereon by illumination, the combination comprising:
a mask having an aperture surrounded by a first opaque surface on one side and through which an image area is projected onto said electrophotosensitive surface;
means for supporting said electrophotosensitive surface in a fixed position in alignment with said aperture during projection of the image area;
illuminating means; and
illumination directing means on said mask responsive to said illuminating means for directing illumination on a border portion of said electrophotosensitive surface bordering said projected image area on said electrophotosensitive surface while said electrophotosensitive surface remains at said fixed position.

17. The invention according to claim 16 wherein said illuminating means surrounds said illumination directing means.

18. The invention according to claim 16 wherein said illumination directing means comprises an illumination transmitting portion of said mask.

19. The invention according to claim 16 wherein said illumination directing means comprises an illumination transmitting portion of said mask surrounding said aperture.

20. The invention according to claim 16 wherein said illumination directing means comprises an illumination transmitting portion of said mask having a beveled surface surrounding and contiguous to said aperture.

21. The invention according to claim 16 wherein said illumination directing means comprises an illumination transmitting portion of said mask having a beveled surface surrounding and contiguous to said aperture and facing the same direction that the illumination is being directed, and said illuminating means surrounds said illumination directing means.

22. The invention according to claim 16 wherein said illumination directing means comprises said mask formed of a light transmitting material, said mask having a beveled surface on its opposite side surrounding and contiguous to said aperture and facing the same direction that the illumination is being directed, said mask further having a second opaque surface on its opposite side surrounding said beveled surface and cooperating with said first opaque surface to form an illumination guide to said beveled surface, and said illuminating means surrounds said illumination directing means.

23. In an exposing system for a copying device of the type having a material holding station for a material having an image area to be copied, an exposing station having a charged electrophotosensitive surface, including means for supporting said electrophotosensitive surface in a fixed position along an optic path, and an illumination projecting means including optics for illuminating said material and projecting said image area along said optic path onto said charged electrophotosensitive surface to form a latent electrostatic copy of said image area, the combination comprising:
a mask positioned in said optic path and having an aperture surrounded by a first opaque surface on one side and through which said image area is projected onto said electrophotosensitive surface;
illuminating means; and
illumination directing means on said mask responsive to said illuminating means for directing illumination on a border area of said electrophotosensitive surface bordering said projected image area on said electrophotosensitive surface for discharging said border area while said electrophotosensitive surface remains at said fixed position.

24. The invention according to claim 23 wherein said illumination directing means comprises said mask formed of an illumination transmitting material, said mask having a beveled surface on its opposite side surrounding and contiguous to said aperture and facing the same direction that the illumination is being directed, said mask further having a second opaque surface on its opposite side surrounding said beveled surface and cooperating with said first opaque surface to form a light guide to said beveled surface, and said illuminating means surrounds said illumination directing means.

25. The invention according to claim 23 wherein in a first condition of operation said charged electrophotoconductive surface attracts pigment and in a second condition of operation said charged electrophotoconductive surface repels pigment, and said illuminating means is selectively activated for said first condition of operation and inactivated for said second condition of operation.

References Cited
UNITED STATES PATENTS

| | | | |
|---|---|---|---|
| 3,375,806 | 4/1968 | Nost | 355—3 X |
| 3,556,655 | 1/1971 | Lux et al. | 355—55 |

SAMUEL S. MATTHEWS, Primary Examiner

R. M. SHEER, Assistant Examiner

U.S. Cl. X.R.

355—3, 11, 17; 96—1 R

PO-1050
(5/69)

UNITED STATES PATENT OFFICE
CERTIFICATE OF CORRECTION

Patent No. 3,671,121            Dated September 8, 1972

Inventor(s) Donald J. Albert

It is certified that error appears in the above-identified patent and that said Letters Patent are hereby corrected as shown below:

In the Specification, Column 2, cancel from line 49 beginning with "rounded" to line 54 ending with "ing" and insert therefor --rounding the aperture and useful, when a positive copy is made by reverse development of a negative original (light transmitting image and dark background) surrounded by a light reflecting or light transmitting border, for preventing illumination of the border area surrounding--.

Signed and sealed this 3rd day of April 1973.

(SEAL)
Attest:

EDWARD M. FLETCHER, JR.           ROBERT GOTTSCHALK
Attesting Officer                   Commissioner of Patents